United States Patent

Ost et al.

[15] 3,696,106
[45] Oct. 3, 1972

[54] N,N'-BIS-[(1-AMIDO 2,2,2 TRICHLORO)-ETHYL]-PIPERAZINE

[72] Inventors: Walter Ost, Klaus Thomas, Dietrich Jerchel, all of Ingelheim/Rhine; Karl-Richard Appel, Biberach/Rissegg, all of Germany

[73] Assignee: C. H. Boehringer soh, Ingelheim/Rhine, Germany

[22] Filed: Nov. 4, 1970

[21] Appl. No.: 87,015

Related U.S. Application Data

[63] Continuation-in-part of Ser. No. 793,187, Jan. 22, 1969, Pat. No. 3,595,916.

[30] Foreign Application Priority Data

Jan. 23, 1968 Austria............67468123

[52] U.S. Cl.............................260/268 R, 424/250
[51] Int. Cl. .............................C07d 51/70
[58] Field of Search.........................260/208 R

[56] References Cited

UNITED STATES PATENTS 3,624,088  11/1971  Benko et al............260/288 R

*Primary Examiner*—Donald G. Daus
*Attorney*—Hammond & Littell

[57] ABSTRACT

Biocidal compounds of the formula

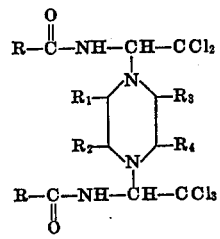

wherein R is hydrogen or lower alkyl which may have one or more halogen atoms attached thereto,
$R_1$ is hydrogen, lower alkyl or phenyl, and
$R_2$, $R_3$ and $R_4$ are each hydrogen or lower alkyl.

4 Claims, No Drawings

N,N'-BIS-[(1-AMIDO 2,2,2 TRICHLORO)-ETHYL]-PIPERAZINE

This is a continuation-in-part of copending application, Ser. No. 793,187, filed Jan. 22, 1969, now U.S. Pat. No. 3,595,916 issued July 27, 1971.

This invention relates to novel piperazine compounds, as well as to a method of preparing the same.

More particularly, the present invention relates to a novel class of piperazine compounds of the formula

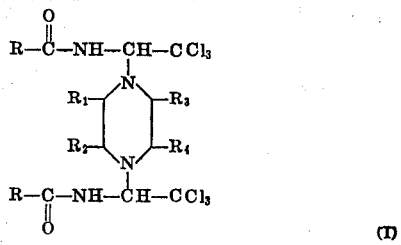

wherein R is hydrogen or straight or branched lower alkyl which may have one or more halogen substituents attached thereto, $R_1$ is hydrogen, lower alkyl or phenyl, and $R_2$, $R_3$ and $R_4$ are each hydrogen or lower alkyl.

A compound of the formula I may be prepared by reacting a compound of the formula

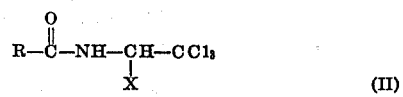

wherein R has the same meanings as in Formula I and X is a substituent which may easily be split off in the form of an anion, such as chlorine, bromine, arylsulfonyloxy, alkyl-sulfonyloxy, aryloxy, trifluoroacetoxy or arylcarbonyloxy, with a piperazine of the formula

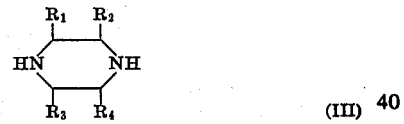

wherein $R_1$, $R_2$, $R_3$ and $R_4$ have the same meanings as in Formula I, pursuant to the following reaction formula

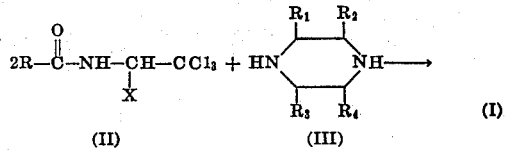

The reaction is preferably carried out in the presence of an inert organic solvent, such as tetrahydrofuran, dioxane, toluene, acetone or a chlorinated hydrocarbon, at a temperature between about −20° C. and +100° C., preferably between +20° C. and +40° C.

When X in Formula II is chlorine or bromine it is advantageous to add to the reaction mixture an equivalent amount of a tertiary amine, such as triethylamine. In those instances it is assumed that a reactive intermediate of the formula R—CO—N=CH—CCl$_3$ is formed, which then reacts further to undergo an additional reaction with the piperazine III and forms a compound of the formula I.

The end products of the Formula I thus obtained are weak bases; they are colorless crystalline solids which are sparsely soluble in water. However, all of the bases are relatively easily soluble in dimethylsulfoxide, tetrahydrofuran, cyclohexanone, dimethylformamide, N-methyl-pyrrolidone and butyrolactone.

The starting compounds of the Formula II may be prepared pursuant to known processes, such as by exchange of the hydroxyl group in a compound of the formula R—CO—NH—CHOH—CCl$_3$ for a substituent X, as defined in connection with Formula II above.

The following examples further illustrate the present invention and will enable others skilled in the art to understand it more completely. It should be understood, however, that the invention is not limited solely to the particular examples given below.

EXAMPLE 1

Preparation of N,N'-bis-[(1-acetamido-2,2,2-trichloro)-ethyl]-piperazine

While stirring, a solution of 3.44 gm (0.04 mol) of piperazine and 8.2 gm (0.081 mol) of triethylamine in 60 cc of peroxide-free tetrahydrofuran was added dropwise to a solution of 18.0 gm (0.08 mol) of N-(1,2,2,2-tetrachloro-ethyl)-acetamide in 50 cc of peroxide-free tetrahydrofuran. Thereafter, the reaction mixture was allowed to stand for one hour at room temperature, then vacuum-filtered, the filter cake of triethylamine hydrochloride was washed with tetrahydrofuran, and the filtrate was evaporated in vacuo. The semi-solid residue was digested with ether, and the crystalline product formed thereby was separated by vacuum filtration and washed with ether, yielding 15.1 gm (81 percent of theory) of a colorless substance which was recrystallized from isopropanol. The product was identified to be N,N'-bis-[(1-acetamido-2,2,2-trichloro)-ethyl]-piperazine, decomposition point about 180° C. (depending upon the rate of heating), of the formula

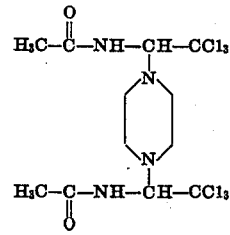

Analysis:
Calculated: C — 31.13%; H — 3.92%; N — 12.10%
Found: C — 31.07%; H — 4.13%; N — 11.94%

EXAMPLE 2

Using a procedure analogous to that described in Example 1, N,N'-bis-[(1-dichloroacetamido-2,2,2-trichloro)-ethyl]-piperazine, decomposition point about 180° C., of the formula

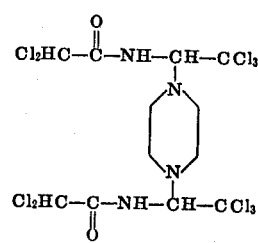

was prepared from N-(1,2,2,2-tetrachloro-ethyl)-dichloroacetamide and piperazine. The yield was 94 percent of theory.

Analysis:
Calculated: C—23.99%; H—2.35%; Cl—59.01%; N—9.33%
Found: C—24.16%; H—2.33%; Cl—58.5%; N—9.03%

EXAMPLE 3

Using a procedure analogous to that described in Example 1, N,N'-bis-[(1-trichloroacetamido-2,2,2-trichloro)-ethyl]-piperazine, decomposition point about 180° C., of the formula

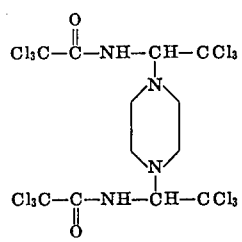

was prepared from N-(1,2,2,2-tetrachloroethyl)-trichloroacetamide and piperazine. The yield was 45 percent of theory.

Analysis:
Calculated: C — 21.52%; H — 1.81%; N — 8.36%
Found: C — 21.40%; H — 1.95%; N — 8.31%

EXAMPLE 4

Using a procedure analogous to that described in Example 1, N,N'-bis-[(1-formamido-2,2,2-trichloro)-ethyl]- 2-methyl-piperazine, decomposition point about 167° C., of the formula

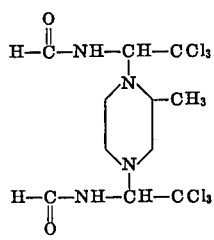

was prepared from N-(1,2,2,2-tetrachloro-ethyl)-formamide and 2-methyl-piperazine. The glassy-amorphous residue remaining after evaporation of the tetrahydrofuran solution was dissolved in methylene chloride while gently heating, and after a few minutes of standing the reaction product crystallized out of the solution in the form of colorless crystals. The yield was 79 percent of theory.

EXAMPLE 5

Using a procedure analogous to that described in Example 1, N,N'-bis-[(1-trimethylacetamido-2,2,2-trichloro)-ethyl]-piperazine, decomposition point about 200° C., of the formula

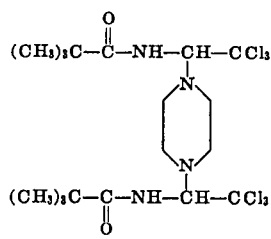

was prepared from N-(1,2,2,2-tetrachloro-ethyl)-pivalic acid amide and piperazine. The product partially precipitated from the tetrahydrofuran solution together with the triethylamine hydrochloride; a second fraction was obtained by evaporating the mother liquor in vacuo. The total yield was 85 percent of theory.

Analysis:
Calculated: C — 39.51%; H — 5.53%; N — 10.24%
Found: C — 39.79%; H — 5.72%; N — 10.26%

EXAMPLE 6

Using a procedure analogous to that described in Example 1, N,N'-bis-[(1-chloroacetamido-2,2,2-trichloro)-ethyl])-piperazine, decomposition point about 173° C., of the formula

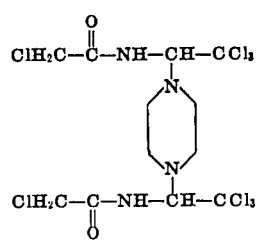

was prepared from N-(1,2,2,2-tetrachloroethyl)-chloroacetamide and piperazine. The yield was 86 percent of theory.

Analysis:
Calculated: C — 27.08%; H — 3.03%; N — 10.53%
Found: C — 27.12%; H — 2.86%; N — 10.20%

EXAMPLE 7

Preparation of N,N'-bis-[(1-formamido-2,2,2-trichloro)-ethyl]-piperazine

While stirring, a solution of 4.3 gm (0.05 mol) of piperazine and 10.5 gm (0.104 mol) of triethylamine in 70 cc of acetone was added dropwise to a solution of 21.1 gm (0.1 mol) of (1,2,2,2-tetrachloro-ethyl)-formamide in 30 cc of acetone. Thereafter, the reaction mixture was allowed to stand at room temperature, and then the precipitate consisting of the reaction product and triethylamine hydrochloride was separated by vacuum filtration, thoroughly washed first with water and then with cold methanol and finally dried at 40° C., yielding a colorless crystalline powder having a decomposition point of about 175° C. (depending upon the rate of heating), which was identified to be N,N'-bis-[(1-formamido-2,2,2-trichloro)-ethyl]-piperazine.

A second fraction of this compound was obtained by evaporation of the acetonic mother liquor and washing of the residue with cold methanol. The total yield was 18.7 gm (86 percent of theory). The product was recrystallizable from dioxane.

Analysis:
    Calculated: C — 27.61%; H — 3.24%; N — 12.88-
    Found: C — 27.90%; H — 3.38%; N — 12.68%

EXAMPLE 8

N,N'-Bis-[(1-formamido-2,2,2-trichloro)-ethyl]-piperazine 21.1 gm (0.1 mol) of powdered N-(1,2,2,2-tetrachloro-ethyl)-formamide were suspended in 50 cc of water and, while stirring, a mixture of 4.3 gm (0.05 mol) of piperazine, 10.1 gm (0.1 mol) of triethylamine and 50 cc of water was added dropwise to the suspension at 20° – 25° C. Thereafter, the reaction mixture was stirred for 30 minutes more at room temperature, the aqueous phase was decanted, and the tacky crystalline residue was digested with 30 cc of methanol, vacuum filtered, and washed with methanol. 50 percent of theory of N,N'-bis-[(1-formamido-2,2,2-trichloro)-ethyl]-piperazine was obtained.

EXAMPLE 9

N,N'-Bis-[(1-formamido-2,2,2-trichloro)-ethyl]-piperazine 5.3 gm (0.05 mol) of sodium carbonate were added to a solution of 21.1 gm (0.1 mol) of N-(1,2,2,2-tetrachloroethyl)-formamide in 50 cc of acetone, and then, while stirring, a solution of 4.3 gm (0.05 mol) of piperazine in 50 cc of acetone was added dropwise. Thereafter, the reaction mixture was stirred for thirty minutes more, the acetone was distilled off in vacuo, and the residue was washed first with water and then with cold methanol and finally dried. The yield was 77 percent of theory of N,N'-bis-[(1-formamido-2,2,2-trichloro)-ethyl]-piperazine.

EXAMPLE 10

Using a procedure analogous to that described in Example 1, N,N'-bis-[(1-propionamido-2,2,2-trichloro)-ethyl]-piperazine, decomposition point 184°–185° C., of the formula

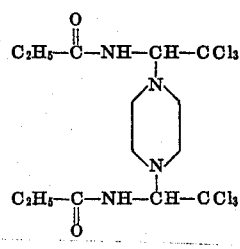

was prepared from N-[(1,2,2,2-trichloro)-ethyl]-propionamide and piperazine. The yield was 45 percent of theory.

EXAMPLE 11

Using a procedure analogous to that described in Example 1, N,N'-bis-[(1-propionamido-2,2,2-trichloro)-ethyl]-2-methyl-piperazine, decomposition point 165°–167° C., of the formula

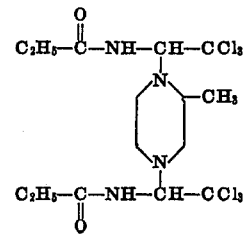

was prepared from N-[(1,2,2,2-tetrachloro)-ethyl] propionamide and 2-methyl-piperazine. The yield was 66 percent of theory.

EXAMPLE 12

Using a procedure analogous to that described in Example 1, N,N'-bis-[(1-fluoroacetamido-2,2,2-trichloro-ethyl]-piperazine, decomposition point 163°–168° C., of the formula

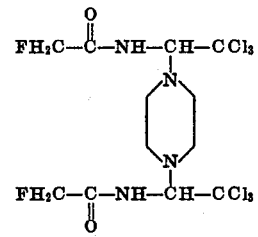

was prepared from N-[(1,2,2,2-tetrachloro)-ethyl]-fluoroacetamide and piperazine. The yield was 64 percent of theory.

EXAMPLE 13

Using a procedure analogous to that described in Example 1, N,N'-bis-[(1-fluorocentamido-2,2,2-trichloro)-ethyl]-2-methyl-piperazine, decomposition point 138°–142° C., of the formula

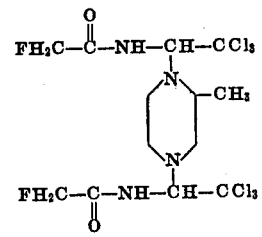

was prepared from N-[(1,2,2,2-tetrachloro)-ethyl]-fluoroacetamide and 2-methyl-piperazine. The yield was 29 percent of theory.

EXAMPLE 14

Using a procedure analogous to that described in Example 1, N,N'-bis-[(1-trichloroacetamido-2,2,2-trichloro)-ethyl]-2-methyl-piperazine, decomposition point 130°–135° C., of the formula

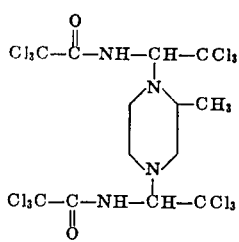

was prepared from N-[(1,2,2,2-tetrachloro)-ethyl]-trichloroacetamide and 2-methyl-piperazine. The yield was 50% of theory.

EXAMPLE 15

Using a procedure analogous to that described in Example 1, N,N'-bis-[(1-trifluoroacetamido-2,2,2-trichloro)-ethyl]-piperazine, decomposition point 155°–158° C., of the formula

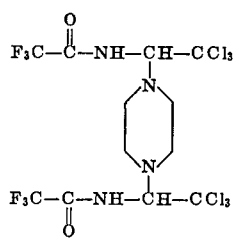

was prepared from N-[(1,2,2,2-tetrachloro)-ethyl]-trifluoroacetamide and piperazine. The yield was 76 percent of theory.

EXAMPLE 16

Using a procedure analogous to that described in Example 1, N,N'-bis-[(1-formamido-2,2,2-trichloro)-ethyl]- 2,5-dimethyl-piperazine, decomposition point 184° C., of the formula

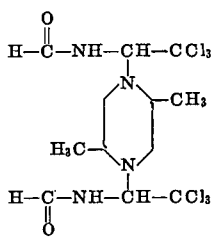

was prepared from N-[(1,2,2,2-tetrachloro)-ethyl]-formamide and a mixture of cis- and trans-isomers of 2,5-dimethyl-piperazine. The yield was 28 percent of theory.

EXAMPLE 17

Using a procedure analogous to that described in Example 1, N,N'-bis-[(1-formamido-2,2,2-trichloro)-ethyl]-2,3,5,6-tetramethyl-piperazine, decomposition point 180° C., of the formula

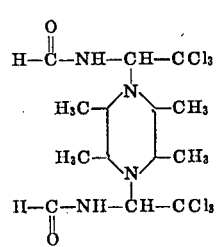

was prepared from N-[(1,2,2,2-tetrachloro)-ethyl]-formamide and a stereoisomeric mixture of 2,3,5,6-tetramethyl-piperazine. The yield was 45 percent of

EXAMPLE 18

Using a procedure analogous to that described in Example 1, N,N'-bis-[(1-formamido-2,2,2-trichloro)-ethyl]-2,3-trans-dimethyl-piperazine, decomposition point 182° C., of the formula

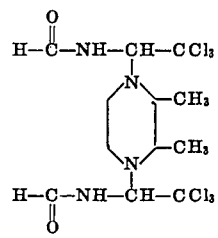

was prepared from N-[(1,2,2,2-tetrachloro)-ethyl]-formamide and trans-2,3-dimethyl-piperazine. The yield was 17 percent of theory.

EXAMPLE 19

Using a procedure analogous to that described in Example 1, N,N'-bis-[(1-formamido-2,2,2-trichloro)-ethyl]-trans-2-methyl-3-ethyl-piperazine, decomposition point 172° C. of the formula

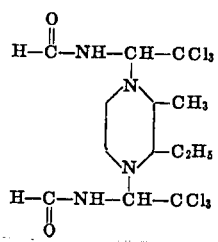

was prepared from N-[(1,2,2,2-tetrachloro)-ethyl]-formamide and trans-2-methyl-3-ethyl-piperazine. The yield was 15 percent of theory.

EXAMPLE 20

Using a procedure analogous to that described in Example 1, N,N'-bis-[(1-formamido-2,2,2-trichloro)-ethyl]-cis-2,3-dimethyl-piperazine, decomposition point 173° C., was prepared from N-[(1,2,2,2-tetrachloro)-ethyl]-formamide and cis-2,3-dimethyl-piperazine. The yield was 36 percent of theory.

EXAMPLE 21

Using a procedure analogous to that described in Example 1, N,N'-bis-[(1-formamido-2,2,2-trichloro)-ethyl]-2-phenyl-piperazine, decomposition point 192° C., of the formula

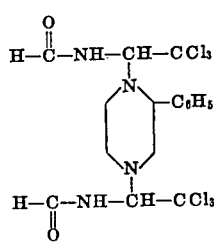

was prepared from N-[(1,2,2,2-tetrachloro)-ethyl]-formamide and 2-phenyl-piperazine. The yield was 16 percent of theory.

EXAMPLE 22

Using a procedure analogous to that described in Example 1, N,N'-bis-[(1-formamido-2,2,2-trichloro)-ethyl]-2-ethyl-piperazine, decomposition point 164°–166° C., of the formula

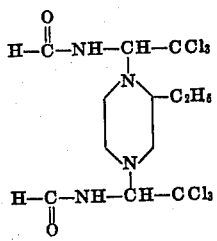

was prepared from N-[(1,2,2,2-tetrachloro)-ethyl]-formamide and 2-ethyl-piperazine. The yield was 40 percent of theory.

EXAMPLE 23

Using a procedure analogous to that described in Example 1, N,N'-bis-[(1-formamido-2,2,2-trichloro)-ethyl]-2,3,5-trimethyl-piperazine, decomposition point 168° C., of the formula

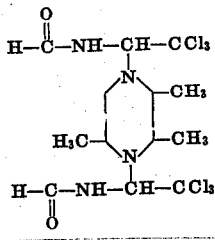

was prepared from N-[(1,2,2,2-tetrachloro)-ethyl]-formamide and a stereoisomeric mixture of 2,3,5-trimethyl-piperazine. The yield was 12 percent of theory.

EXAMPLE 24

Using a procedure analogous to that described Example 1, N,N'-bis-[(1-formamido-2,2,2-trichloro)-ethyl]-2-n-propyl-piperazine, decomposition point 174° C., of the formula

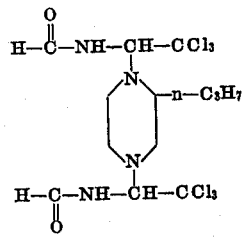

was prepared from N-[(1,2,2,2-tetrachloro)-ethyl]-formamide and 2-n-propyl-piperazine. The yield was 20 percent of theory.

EXAMPLE 25

Using a procedure analogous to that described in Example 1, N,N'-bis-[(1-formamido-2,2,2-trichloro)-ethyl]-2,6-dimethyl-piperazine, decomposition point 171°–172° C., of the formula

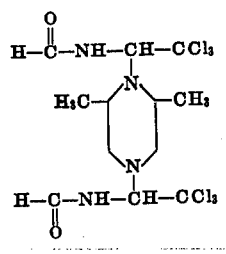

was prepared from N-[(1,2,2,2-tetrachloro)-ethyl]-formamide and 2,6-dimethyl-piperazine. The yield was 11 percent of theory.

EXAMPLE 26

N,N'-Bis-[(1-formamido-2,2,2-trichloro)-ethyl]-piperazine.

A mixture consisting of 2.1 gm (0.025 mol) of piperazine, 5.1 gm (0.05 mol) of triethylamine, 6.8 gm (0.05 mol) of [(1-formamido-2,2,2-trichloro)-ethoxy]-benzene and 50 cc of absolute tetrahydrofuran was allowed to stand for 14 hours at room temperature, and thereafter was refluxed for 2 hours. Subsequently, the reaction solution was filtered, the filtrate was evaporated in vacuo, and the viscous brown residue, which had an odor of phenol, was digested with 15 cc of methanol. After several hours of standing, about 10 percent of theory of N,N'-bis-[(1-formamido-2,2,2-trichloro)-ethyl]-piperazine had crystallized out.

The starting compound, [(1-formamido-2,2,2-trichloro)-ethoxy]-benzene, m.p. 93°–94° C., was obtained with a yield of 83 percent of theory from N-[(1,2,2,2-tetrachloro)-ethyl]-formamide and phenol in the presence of triethylamine.

EXAMPLE 27

N,N'-Bis-[(1-formamido-2,2,2-trichloro)-ethyl]-piperazine.

1.2 gm (0.014 mol) of piperazine and 7.1 gm (0.028 mol) of [1-formamido-1-(methylsulfonyl)-2,2,2-trichloro]-ethane were dissolved in 50 cc of absolute tetrahydrofuran, 2.9 gm (0.028 mol) of triethylamine were added to the solution, and the mixture was allowed to stand for several hours at room temperature. Thereafter, the reaction solution was diluted with water, and the precipitate formed thereby was collected by vacuum filtration and washed first with water and then with methanol. 96 percent of theory of N,N'-bis-[(1-formamido-2,2,2-trichloro)-ethyl]-piperazine were obtained.

The starting compound, [1-formamido-1-(methylsulfonyl)-2,2,2-trichloro]-ethane, m.p. 132°–133° C., was prepared in the following manner: N-[(1,2,2,2-tetrachloro)-ethyl]-formamide was first reacted with methylmercaptan in the presence of triethylamine, yielding 82 percent of theory of (1-formamido-1-methylmercapto-2,2,2-trichloro)-ethane, m.p. 122°–123° C., which was subsequently oxidized with hydrogen peroxide in acetic acid at 20° C. The yield was 66 percent of theory.

The compounds according to the present invention, that is, those embraced by Formula I above, have useful properties. More particularly, the compounds of the invention are highly effective fungicides with very low phytotoxicity; thus they may be effectively used for prophylactic as well as curative treatment of plants against phytopathogenic fungi. For instance, complete prevention against infestation is achieved in the case of a number of true mildew fungi, such as *Erysiphe graminis* and *Erysiphe polygoni*. Furthermore, the compounds according to the invention are effective in combatting rust fungi, such as *Uromyces fabae* and *Puccinia arenariae;* causes of wilting diseases, such as *Verticillium alboatrum;* causes of plant scabs, such as *Venturia inaequalis;* mold fungi, such as *Aspergillus niger;* and various other harmful fungi, such as Fusaria and Ophiobuli.

Particularly noteworthy is a good systemic effect of the novel compounds.

The compounds according to the present invention are also useful as anthelmintics and enhance the germination of seeds, such as pea and cotton seeds.

The compounds of the Formula I also exhibit very low toxicity toward warm-blooded animals.

For prophylactic or curative treatment of plants against fungus infestation, the compounds according to the present invention are incorporated as active ingredients into customary fungicidal compositions, i.e., compositions consisting essentially of a liquid or comminuted solid inert carrier and an effective fungicidal amount of the active ingredient, such as solutions, emulsion concentrates, suspendable or wettable powders, dusting powders, granulates and sprays. The active ingredient content of these compositions is about 0.5 to 85 percent by weight, preferably 0.5 to 50 percent by weight.

For instance, an emulsion concentrate contains about 0.5 to 20 percent by weight, preferably 5 to 10 percent by weight, of a compound of the Formula I. Suitable solvents for the preparation of emulsion concentrates comprising a compound of the invention as an active ingredient are, for example, mixtures of dimethylformamide or N-methylpyrrolidone with alcohols or glycols. Suitable emulsifiers and wetting agents which may be used for the preparation of such emulsion concentrates are ionic or non-ionic compounds, such as nonylphenol polyglycol ether, or mixtures of non-ionic and ionic, preferably anionic, compounds as well as ampholytes. The emulsifier content of the emulsion concentrate is about 0.5 to 45 percent by weight, preferably 5 to 40 percent by weight.

The active ingredient content of a wettable powder is about 0.5 to 80 percent by weight, preferably 20 to 60 percent by weight. Suitable emulsifiers and wetting agents which may be used for the preparation of wettable powders are non-ionic or ionic compounds of the type described in the preceding paragraph; the total amount of emulsifier and wetting agent in such wettable powders is about 0.5 to 25 percent by weight, preferably 2 to 25 percent by weight. Suitable powdery inert carriers are, for example, bentonite, kaolin and colloidal silicic acid.

The fungicidal compositions comprising a compound of the present invention as an active ingredient are, if necessary, diluted with water to an active ingredient concentration of 0.5 to 0.00001 percent prior to their use for combatting fungi. Dusting powders may have a higher active ingredient concentration. The upper limit for the application concentration is predicated upon the relatively low phytotoxicity.

The following examples illustrate a few fungicidal compositions comprising a compound of the instant invention as an active ingredient and represent the best mode contemplated of putting the invention to practical use. The percentages are percent by weight.

EXAMPLE 28

Dusting Powder

| | |
|---|---|
| N,N'-Bis-[(1-formamido-2,2,2-trichloro)-ethyl]-piperazine | 1% |
| Talcum | 98% |
| Methylcellulose | 1% |

The components were admixed with each other, and the mixture was milled until homogeneous. The resulting powder was an effective fungicidal composition, especially against mildew and the like.

EXAMPLE 29

Wettable Powder

| | |
|---|---|
| N,N'-Bis-[(1-formamido-2,2,2-trichloro)-ethyl]-2-methyl-piperazine | 25% |
| Kaolin | 55% |
| Colloidal silicic acid | 10% |
| Lignin sulfonate (dipersing agent) | 9% |
| Sodium tetrapropylene benzene sulfonate (wetting agent) | 1% |

The components were admixed, the mixture was milled until homogeneous, and prior to use the powder was suspended in an amount of water such that the active ingredient concentration in the aqueous suspension was from 0.00001 to 0.5 percent by weight. The suspension was an effective fungicidal spray, especially against mildew and the like.

EXAMPLE 30

Emulsion Concentrate

| | |
|---|---|
| N,N'-Bis-[(1-acetamido-2,2,2-trichloro)-ethyl]-piperazine | 10% |
| Sodium tetrapropylene benzene sulfonate (anionic emulsifier) | 5% |
| Nonylphenol polyglycol ether (non-ionic emulsifier) | 20% |
| Propyleneglycol | 32.5% |
| N-Methylpyrrolidone | 32.5% |

The components were uniformly admixed with each other, and prior to use the resulting concentrate was diluted with water to the desired active ingredient content between 0.00001 and 0.5 percent by weight. The resulting aqueous emulsion was an effective fungicidal spray, especially against mildew and the like.

EXAMPLE 31

Aerosol Spray

| | |
|---|---|
| N,N'-Bis-[(1-trichloroacetamido-2,2,2-trichloro)-ethyl]-piperazine | 0.05% |
| Sesame oil | 0.10% |
| N-Methylpyrrolidone | 10.00% |
| Propellant gas | 89.85% |

The components were admixed in customary fashion, and the mixture was charged into aerosol containers provided with a spray valve. The resulting aerosol was an effective fungicidal spray, especially against mildew and the like.

EXAMPLE 32

Wettable powder
| | |
|---|---|
| N,N'-Bis-[(1-trimethylamido-2,2,2-trichloro)-ethyl]-piperazine | 85% |
| Calcium lignin sulfonate | 8% |
| Colloidal silicic acid | 5% |
| Diisobutyl naphthalene sodium sulfonate | 2% |

The components were admixed, the mixture was milled until homogeneous, and prior to use the powder was suspended in an amount of water such that the active ingredient concentration in the aqueous suspension was from 0.00001 to 0.5 percent by weight. The suspension was an effective fungicidal spray, especially against mildew and the like.

Analogous results were obtained when any one of the other compounds embraced by Formula I was substituted for the particular piperazine compounds in Examples 28 through 32. Likewise, the amounts and nature of the inert ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

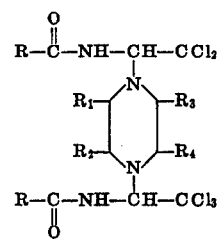

wherein R is hydrogen or alkyl or one to four carbon atoms which may have from one to three halogen atoms attached thereto,
$R_1$ is hydrogen, alkyl of one to three carbon atoms or phenyl,
$R_2$ is hydrogen, methyl or ethyl, and $R_3$ and $R_4$ are each hydrogen or methyl.

2. A compound according to claim 1,
wherein R is hydrogen, alkyl of one to four carbon atoms, chloromethyl, dichloromethyl, trichloromethyl, fluoromethyl or trifluoromethyl,
$R_1$ is hydrogen, alkyl of one to three carbon atoms or phenyl,
$R_2$ is hydrogen, methyl or ethyl, and
$R_3$ and $R_4$ are each hydrogen or methyl.

3. The compound according to claim 1 which is N,N'-bis-[(1-formamido-2,2,2-trichloro)-ethyl]-2-methyl-piperazine.

4. The compound according to claim 1 which is N,N'-bis-[(1-formamido-2,2,2-trichloro)-ethyl]-piperazine.

* * * * *